United States Patent
Ramiro Moreno et al.

(10) Patent No.: US 12,401,435 B2
(45) Date of Patent: Aug. 26, 2025

(54) ARTIFICIAL INTELLIGENCE BASED MANAGEMENT OF WIRELESS COMMUNICATION NETWORK

(71) Applicant: Telefonaktiebolaget LM Ericsson (publ), Stockholm (SE)

(72) Inventors: Juan Ramiro Moreno, Malaga (ES); Jose Outes Carnero, Torremolinos (ES); Paulo Antonio Moreira Mijares, Malaga (ES); Jose Maria Ruiz Aviles, Malaga (ES); Adriano Mendo Mateo, Malaga (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 376 days.

(21) Appl. No.: 17/914,592

(22) PCT Filed: Mar. 17, 2021

(86) PCT No.: PCT/EP2021/056773
§ 371 (c)(1),
(2) Date: Sep. 26, 2022

(87) PCT Pub. No.: WO2021/191011
PCT Pub. Date: Sep. 30, 2021

(65) Prior Publication Data
US 2023/0224055 A1 Jul. 13, 2023

(30) Foreign Application Priority Data

Mar. 26, 2020 (EP) .................................... 20382233

(51) Int. Cl.
*H04B 17/318* (2015.01)
*H04L 41/16* (2022.01)
(Continued)

(52) U.S. Cl.
CPC ........... *H04B 17/318* (2015.01); *H04L 41/16* (2013.01); *H04W 16/18* (2013.01); *H04W 24/02* (2013.01)

(58) Field of Classification Search
CPC ...... H04B 17/318; H04L 41/16; H04W 16/18; H04W 24/02
See application file for complete search history.

(56) References Cited

U.S. PATENT DOCUMENTS 10,716,089 B1 * 7/2020 Huberman .......... H04W 64/006

FOREIGN PATENT DOCUMENTS

| CN | 103533554 A | 1/2014 | |
|---|---|---|---|
| WO | WO-2016001473 A1 * | 1/2016 | ............. G09B 29/00 |

(Continued)

OTHER PUBLICATIONS

International Search Report and the Written Opinion of the International Searching Authority, issued in corresponding International Application No. PCT/EP2021/056773, dated Jun. 4, 2021, 9 pages.

(Continued)

*Primary Examiner* — Mohammad S Anwar
(74) *Attorney, Agent, or Firm* — Rothwell, Pigg, Ernst & Manbeck, P.C.

(57) ABSTRACT

Deviations of signal strengths in a first frequency band from signal strengths in at least one second frequency band are predicted based on a trained machine-learning model (350'). At least one source signal strength map is obtained. The at least one source signal strength map describes signal strengths in the at least one second frequency band for a coverage area of the wireless communication network. Based on the at least one source signal strength map and the predicted deviations of signal strengths, at least one target signal strength map describing signal propagation in the first frequency band for the coverage area is determined.

20 Claims, 8 Drawing Sheets

(51) Int. Cl.
*H04W 16/18* (2009.01)
*H04W 24/02* (2009.01)

(56) References Cited

FOREIGN PATENT DOCUMENTS

WO    2019120487 A1    6/2019
WO    2021123923 A1    6/2021

OTHER PUBLICATIONS

Kántor et al. "Influence of Climate Variability on Performance of Wireless Microwave Links" 2013 IEEE 24th International Symposium on Personal, Indoor and Mobile Radio Communications: Fundamentals and PHY Track, pp. 891-895.

Ostlin et al. "Macrocell Radio Wave Propagation Prediction using an Artificial Neural Network" 2004 IEEE, pp. 57-61.

Akhoondzadeh-Asl et al. "Modification and Tuning of the Universal Okumura-Hata Model for Radio Wave Propagation Predictions" Proceedings of Asia-Pacific Microwave Conference 2007, IEEE., 4 pages.

Chahat et al. "On-Body Propagation at 60 Ghz" IEEE Transactions On Antennas and Propagation, vol. 61, No. 4, Apr. 2013, pp. 1876-1888.

Kanhere "Participatory Sensing: Crowdsourcing Data from Mobile SmartPhones in Urban Spaces" 2011 12th IEEE International Conference on Mobile Data Management, pp. 3-6.

Yun et al. "Ray Tracing for Radio Propagation Modeling: Principles and Applications" 2015 IEEE, vol. 3, 2015, pp. 1089-1100.

Zhang et al. "Wideband 39 GHz Millimeter-Wave Channel Measurements under Diversified Vegetation" 2018 IEEE 29th Annual International Symposium on Personal, Indoor, and Mobile Radio Communications (PIMRC), 6 pages.

\* cited by examiner

ARTIFICIAL INTELLIGENCE BASED MANAGEMENT OF WIRELESS COMMUNICATION NETWORK

CROSS REFERENCE TO RELATED APPLICATION(S)

This application is a 35 U.S.C. § 371 National Phase Entry Application from PCT/EP2021/056773, filed Mar. 17, 2021, designating the United States, and also claims the benefit of European Application No. 20382233.3, filed Mar. 26, 2020, the disclosures of which are incorporated herein by reference in their entirety.

TECHNICAL FIELD

The present invention relates to methods for managing a wireless communication network and to corresponding devices, systems, and computer programs.

BACKGROUND

In wireless communication technologies, there is an increased interest in expansion to new frequency bands. For example, new frequency bands in UHF (Ultra High Frequency), SHF (Super High Frequency), and EHF (Extreme High Frequency) bands are being considered for utilization in 5G ($5^{th}$ Generation) networks, e.g., based on the NR (New Radio) technology specified by 3GPP ($3^{rd}$ Generation Partnership Project).

Radiofrequency (RF) design and optimization of a wireless communication network requires accurate characterization of the propagation environment for each cell: For example, accurate estimation of pathloss between an antenna of an access node serving a cell and locations in an area of influence of the cell may be needed.

However, prediction of signal propagation characteristics typically become more challenging as the operating frequencies become higher. For example, propagation of millimeter waves is affected by influences which do not have to be considered at lower frequency bands. Examples of such influences include losses due to rain, losses due to vegetation, and human body losses.

For characterizing wireless network propagation environments, it is known to utilize Third Party Publishing (3PP) planning tools. These tools are typically based on two types of techniques: propagation model optimization (PMO) and ray tracing. PMO techniques may use linear regression or other Machine Learning (ML) techniques to tune parameters of a reference propagation model and training based on real measured data. This data can be obtained after extensive drive test measurement campaigns for different morphologies. Examples of such methods are described in "Modification and tuning of the universal Okumura-Hata model for radio wave propagation predictions", Akhoondzadeh-Asl, Lida, and Narges Noori, 2007 Asia-Pacific Microwave Conference. IEEE (2007) and "Macrocell radio wave propagation prediction using an artificial neural network", Ostlin, Erik, H-J. Zepernick, and Hajime Suzuki, IEEE 60th Vehicular Technology Conference, 2004, VTC2004-Fall, Vol. 1, IEEE (2004).

Ray tracing techniques simulate the propagation of radio waves and their very concrete interaction with the obstacles and materials they find across their path towards the receiver. This type of technique is discussed in "Ray tracing for radio propagation modeling: Principles and applications", Yun, Zhengqing, and Magdy F. Iskander, IEEE Access 3 (2015).

The above-mentioned methods above require training data from the planned new frequency band to work. This means that it is necessary to obtain some sample measurements from a least a sub-set of cells in the new frequency band and area to estimate the signal levels in the rest of the area. These measurements are normally obtained through drive test campaigns or through the processing of geolocated call traces from a network where periodical measurement reports have been previously activated. This activation of periodical measurement reports is not always desired from the perspective of network operators, since it implies certain load overhead in the network due to extra signaling and also in most of the cases where the feature minimization of drive test is not activated is subject to a significant geolocation accuracy error which also affects the final model.

In practice, both the PMO techniques and the ray tracing techniques may turn out as being cumbersome to operate and present accuracy challenges. The tuning of parametric models involves a high cost in terms of massive measurement campaigns, and the only way to reduce the cost is to lower the number of tuned propagation models, which may result in suboptimal local adaptation and impacts accuracy negatively. Further, it may be economically unfeasible to adjust an independent propagation model per cell using this methodology. Moreover, once adjusted, models remain unchanged until a new propagation model tuning campaign is carried out, which means that by default there is not any automatic recurrent anchoring with reality, preventing the system from reacting to the appearance new buildings or any other modifications of the landscape. Further, the ray tracing techniques typically require very expensive inputs, e.g. detailed 3D databases and description of different materials, and usually require large computational power to run. Moreover, very often they may suffer from lack of accuracy, e.g., due to not fully up-to-date databases or lack of enough details in the modelling of the different materials that will impact the radio propagation channel. Again, any change in the environment/landscape that is not reflected in the input data will stay unnoticed in the propagation predictions.

Accordingly, there is a need for techniques which allow for efficiently managing a wireless communication network, in particular with respect to planning of deployments in new frequency bands.

SUMMARY

According to an embodiment, a method of managing a wireless communication network is provided. According to the method, deviations of signal strengths in a first frequency band from signal strengths in at least one second frequency band are predicted based on a trained machine-learning model. At least one source signal strength map is obtained. The at least one source signal strength map describes signal strengths in the at least one second frequency band for a coverage area of the wireless communication network. Based on the at least one source signal strength map and the predicted deviations of signal strengths, at least one target signal strength map describing signal strengths in the first frequency band for the coverage area is determined.

According to a further embodiment, a method of managing a wireless communication network is provided. According to the method, a machine-learning model for predicting deviations of signal strengths in a first frequency band from signal strengths in at least one second frequency band is provided. The machine-learning model is trained on the basis of reference signal strength maps describing signal strengths in multiple different reference frequency bands for one or more coverage areas of the wireless communication network.

According to a further embodiment, a device for managing a wireless communication network is provided. The device is configured to predict deviations of signal strengths in a first frequency band from signal strengths in at least one second frequency band based on a trained machine-learning model. Further, the device is configured to obtain at least one source signal strength map describing signal strengths in the at least one second frequency band for a coverage area of the wireless communication network. Further, the device is configured to determine, based on the at least one source signal strength map and the predicted deviations of signal strengths, at least one target signal strength map describing signal strengths in the first frequency band for the coverage area.

According to a further embodiment, a device for managing a wireless communication network is provided. The device comprises at least one processor and a memory. The memory contains instructions executable by said at least one processor, whereby the device is operative to predict deviations of signal strengths in a first frequency band from signal strengths in at least one second frequency band based on a trained machine-learning model. Further, the memory contains instructions executable by said at least one processor, whereby the device is operative to obtain, at least one source signal strength map describing signal strengths in the at least one of the second frequency band for a coverage area of the wireless communication network. Further, the memory contains instructions executable by said at least one processor, whereby the device is operative to determine, based on the at least one source signal strength map and the predicted deviations of signal strengths, at least one target signal strength map describing signal strengths in the first frequency band for at least one of the coverage area.

According to a further embodiment, a device for managing a wireless communication network is provided. The device is configured to provide a machine-learning model for predicting deviations of signal strengths in a first frequency band from signal strengths in at least one second frequency band. Further, the device is configured to train the machine-learning model on the basis of reference signal strength maps describing signal strengths in multiple different reference frequency bands for one or more coverage areas of the wireless communication network.

According to a further embodiment, a device for managing a wireless communication network is provided. The device comprises at least one processor and a memory. The memory contains instructions executable by said at least one processor, whereby the device is operative to provide a machine-learning model for predicting deviations of signal strengths in a first frequency band from signal strengths at least one second frequency band. Further, the memory contains instructions executable by said at least one processor, whereby the device is operative to train the machine-learning model on the basis of reference signal strength maps describing signal strengths in multiple different reference frequency bands for one or more coverage areas of the wireless communication network.

According to a further embodiment of the invention, a computer program or computer program product is provided, e.g., in the form of a non-transitory storage medium, which comprises program code to be executed by at least one processor of a device for managing a wireless communication network. Execution of the program code causes the device to predict deviations of signal strengths in a first frequency band from signal strengths in at least one second frequency band based on a trained machine-learning model. Further, execution of the program code causes the device to obtain, at least one source signal strength map describing signal strengths in the at least one second frequency band for a coverage area of the wireless communication network. Further, execution of the program code causes the device to determine, based on the at least one source signal strength map and the predicted deviations of signal strengths, at least one target signal strength map describing signal strengths in the first frequency band for the coverage area.

According to a further embodiment of the invention, a computer program or computer program product is provided, e.g., in the form of a non-transitory storage medium, which comprises program code to be executed by at least one processor of a device for managing a wireless communication network. Execution of the program code causes the device to provide a machine-learning model for predicting deviations of signal strengths in a first frequency band from signal strengths in at least one second frequency band. Further, execution of the program code causes the device to train the machine-learning model on the basis of reference signal strength maps describing signal strengths in multiple different reference frequency bands for one or more coverage areas of the wireless communication network.

Details of such embodiments and further embodiments will be apparent from the following detailed description of embodiments.

DETAILED DESCRIPTION OF EMBODIMENTS

Figure 1:
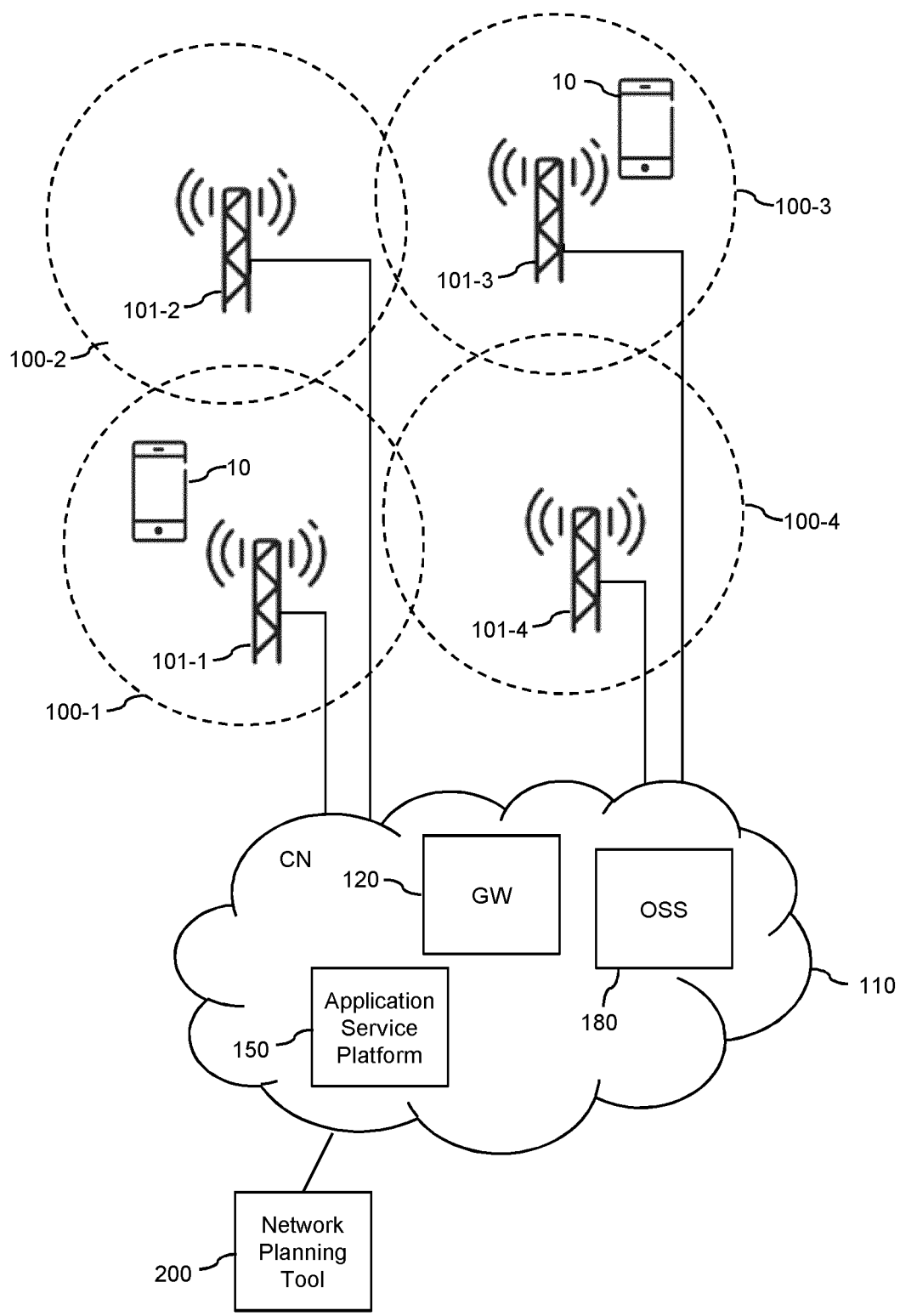
FIG. 1 schematically illustrates a wireless communication network according to an embodiment.

In the following, concepts in accordance with exemplary embodiments of the invention will be explained in more detail and with reference to the accompanying drawings. The illustrated embodiments relate to management of a wireless communication network, in particular with respect to planning of deployment in one or more new frequency bands. The wireless communication network may be based on the LTE and/or NR technology specified by 3GPP. However, other technologies could be used as well.

In the illustrated concepts, an artificial intelligence (AI) based method is applied to estimate target signal strength maps for a certain frequency band, herein also referred to as target band. This may be accomplished per coverage area of the wireless communication network, at individual user locations discretized in the form of pixels. As input, the estimation uses source signal strength maps one or more other frequency bands, herein also referred to as source bands. The source bands may be in a lower frequency range than the target band and thus also be referred to as "baseline bands". However, it is also conceivable that the source bands are, at least in part, in a higher frequency range than the target band. The source signal strength maps may be obtained from coverage areas which have the same or similar to those for which the target signal strength maps are estimated. The coverage areas may correspond to cells of the wireless communication network. However, it is noted that other granularity levels of the signal strength maps could be used as well. For example, the signal strength maps could be defined per cell sector, per cell group, or per tracking area.

As used herein, a signal strength map includes data describing signal strengths for multiple locations in the considered coverage area. These multiple locations may also be referred to as "pixels" of the signal strength map. The pixels may be arranged according to a regular coordinate grid. However, other pixel arrangements could be used as well. By representing signal strengths at multiple locations, the signal strength maps indirectly also describe signal propagation, in particular when assuming that the signals originate from sources with known characteristics.

In the illustrated concepts, the estimation of the target signal strength maps is based on estimating a deviation of signal strengths in the target band from signal strengths in the source band(s). A machine learning (ML) model is applied for estimating the deviation. The deviation may be estimated in terms of an offset or delta of the signal strengths. This estimated deviation may be specific for the considered coverage area and specific for each location within the considered coverage area.

The illustrated method may use the following information as input:
one or more signal strength maps for one or more coverage areas in on or more source bands;
configuration parameters for the source band(s) and the target band(s), including cell topology information, and radio configuration parameters;
configuration management (CM) parameters that influence the values in the signal strength maps;
geographical maps, e.g., including clutter, elevation, and/or clutter height maps.

The input data may be collected from various sources and may be processed to convert it into a desired format. Further, the input data may be subjected to input preprocessing, which may involve that the input data is mathematically manipulated and transformed into features.

In some scenarios, the source signal strength map(s) and/or the reference signal strength maps may be generated from signal level measurements from crowdsourcing data or from geolocated call traces.

In some scenarios, the target signal strength maps may be generated from multiple source signal strength maps per coverage area and/or per source band. In such cases, the multiple source signal strength maps could correspond to different percentile values of a signal level distribution represented by the source signal strength maps. This may for example be beneficial in the case of signal strength maps in the millimeter wave frequency range. In addition or as an alternative, the multiple source signal strength maps could be subjected to averaging.

In some scenarios, the source signal strength map(s) and/or the reference signal strength maps could also be classified to distinguish between indoor and outdoor measurements. In particular, signal strength maps generated from indoor measurements could be classified as indoor signal strength maps, and signal strength maps generated from outdoor measurements could be classified as outdoor signal strength maps In this case, the processing for estimation of the target signal strength maps could be performed separately for indoor and outdoor scenarios. In particular, an indoor target signal strength map could be determined on the basis of one or more indoor source signal strength map(s), using training of the ML model based on indoor reference signal strength maps. Similarly, an outdoor target signal strength map could be determined on the basis of one or more outdoor source signal strength map(s), using training of the ML model based on outdoor reference signal strength maps.

In some scenarios, the input data may also be subjected to cleansing processing to detect and repair defects in the input data related to topology information. For example, such defects could originate form swapping of cell sectors.

For estimating the deviation in signal strengths, a Deep Neural Network (DNN) may be utilized. In particular, the DNN may be used to predict the difference between the signal level in the source band and the signal level at the target band for each pixel of the source signal strength map and the corresponding pixel of the target signal strength map, taking into account the features derived from the input data. The DNN may be trained on the basis of reference signal strength maps for multiple reference frequency bands. In some scenarios, the reference frequency bands may correspond to the source band and the target band. This case is herein also referred to as a per-pair model. In other cases, the reference frequency bands may include additional or alternative frequency bands, differing from the source band and the target band. This case is herein also referred to as a general model. It is noted that utilization of a DNN is merely an example and alternative AI architectures or ML models could be used as well, e.g., other artificial neural networks, supervised learning algorithms, unsupervised learning algorithms, or reinforcement learning algorithms. Further, various additional input data may be utilized to improve the accuracy of the estimations, such as morphology indicators, vegetation maps and/or precipitation data.

FIG. 1 illustrates an exemplary wireless communication network according to an embodiment. In the illustrated example, the wireless communication network covers multiple cells 100-1, 100-2, 100-3, 100-4, each cell being served by a corresponding access node 101-1, 101-2, 101-3, 101-4. The access nodes 101-1, 101-2, 101-3, 101-4 may for example correspond to eNBs of the LTE technology or to gNBs of the NR technology. By way of example, FIG. 1 further illustrates UEs (user equipments) 10 which may connect to the wireless communication network. The UEs 10 may correspond to various kinds of wireless devices, for example user terminals, such as mobile or stationary computing devices like smartphones, laptop computers, desktop computers, tablet computers, gaming devices, or the like. Further, the UEs 10s could for example correspond to other kinds of equipment like smart home devices, printers, multimedia devices, data storage devices, or the like.

In the example of FIG. 1, each of the UEs 10 may connect through a radio link to one of the access nodes 101-1, 101-2, 101-3, 101-4. For example depending on location or channel conditions experienced by a UE 10, an appropriate cell 100-1, 100-2, 100-3, 100-4 and access node 101-1, 101-2,

101-3, 101-4 AP 10 may be selected for establishing the radio link. The radio link may be based on one or more OFDM (orthogonal frequency multiplexing) carriers from a frequency band supported by the wireless communication network. However, depending on the utilized radio technology, other modulation techniques could be used as well.

Each access node 101-1, 101-2, 101-3, 101-4 may provide data connectivity for the UEs 10 connected to it. As further illustrated, the access nodes 101-1, 101-2, 101-3, 101-4 may be further connected to a core network (CN) 110 of the wireless communication network. The CN 110 may ensure data connectivity among different UEs 10 connected to the wireless communication network as well as data connectivity of the UEs 10 to other entities, e.g., to one or more servers, service providers, data sources, data sinks, user terminals, or the like. For this purpose, the CN 110 may include one or more gateways 120, e.g., an SGW (Serving Gateway) and/or PGW (Packet Data Network) of the LTE technology or a UPF (User Plane Function) of the NR technology. Accordingly, the radio link established between a UE 10 and the wireless communication network may be used for providing various kinds of services to the UE 10, e.g., a voice service, a multimedia service, or other data service. Such services may be based on applications which are executed on the UE 10 and/or on a device linked to the UE 10. By way of example, FIG. 1 illustrates an application service platform 150 provided in the CN 110. The application(s) executed on the UE 10 and/or on one or more other devices linked to the UE 10 may use the radio link for data communication with one or more other UEs 10 and/or the application service platform 150, thereby enabling utilization of the corresponding service(s) at the UE 10.

As further illustrated, the CN 110 also includes an operational support system (OSS) 180. The OSS 180 may be responsible for configuring parameters relevant for operation of the wireless communication network, such as RF (radio frequency) parameters applied by the access nodes 101-1, 101-2, 101-3, 101-4 and/or for collecting various data during operation of the wireless communication network. Such collected data may also include coverage data based on measurements performed by the access nodes 101-1, 101-2, 101-3, 101-4 and/or by the UEs 10.

As further illustrated, also a network planning tool 200 may be provided. The network planning tool 200 may be used for planning modification and/or expansion of the wireless communication network. As further explained below, such modification and/or expansion may in particular involve utilization of new frequency bands, using the same or a similar network topology as in existing frequency bands. For this purpose, the network planning tool 200 may utilize data provided by the OSS 180 and the AI based method of the illustrated concepts for estimating target signal strength maps for the new frequency bands.

In the following, the AI based mechanism for estimating target signal strength maps in new frequency bands will be explained in more detail by referring to more specific implementation examples.

Figure 2:
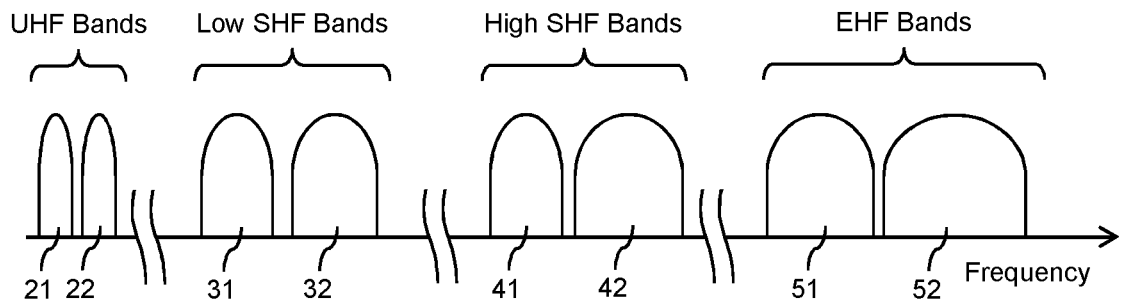
FIG. 2 schematically illustrates frequency bands which may be utilized in an embodiment.

In the illustrated examples, it is assumed that the ML model is based on a DNN and trained on reference signal strength maps from multiple frequency bands. The trained ML model is than applied for estimating deviations in signal strengths between at least one source band and at least one target band, and for predicting one or more target signal strength maps in the target band from one or more source signal strength maps in the source band(s). FIG. 2 shows examples of possible frequency bands 21, 22, 31, 32, 41, 42, 51, 52, including frequency bands from the UHF (ultra high frequency) range (0.3-3 GHz), frequency bands from the low SHF (super high frequency) range (3-6 GHz), frequency bands from the high SHF range (6-30 GHz), and frequency bands from the EHF (extremely high frequency) range (30-300 GHz). In typical scenarios, the target signal strength maps may be the higher part of the UHF range or the low SHF range, also known as mid bands, where very little deployment of wireless communication networks is available so far. This lack of data availability makes it difficult to provide exact models using current PMO techniques. However, it is noted that the illustrated methodology could of course also be applied to other frequency ranges and is not limited to any particular combination of frequency bands. By way of example, for estimating a target signal strength map in a low SHF band, e.g., in band 32, available signal strength maps from bands 21, 22, and 32 could be used as reference signal strength maps when training the ML model, and available signal strength maps from bands 21 and/or 22 could be used as source signal strength maps when estimating the target signal strength map in band 32. However, it is noted that various combinations of bands could be used as reference bands or source bands. For example, for estimating a target signal strength map in a low SHF band, e.g., in band 32, it would also be possible to use available signal strength maps from bands 21, 22, and 41 as reference signal strength maps when training the ML model, and to use available signal strength maps from bands 21 and/or 22 as source signal strength maps when estimating the target signal strength map in band 32. As a further example, for estimating a target signal strength map in a high SHF band, e.g., in band 41, it would also be possible to use available signal strength maps from bands 21, 31, and 51 as reference signal strength maps when training the ML model, and to use available signal strength maps from band 31 as source signal strength maps when estimating the target signal strength map in band 41.

By way of example, it is now assumed that the AI based mechanism is applied with respect to signal strength maps may be defined per cell, such as the above-mentioned cells 100-1, 100-2, 100-3, and 100-4. Each signal strength map represents a set of received signal levels at different locations in the cell, with each location corresponding to a pixel of the signal strength map. The pixels can be organized in a regular grid or any other regular or irregular arrangement.

In the AI based mechanism, yet unknown signal strength maps in the target band may be derived from known signal strength maps in the source band(s), using the trained ML model to estimate the location and cell-specific difference in signal strengths between the source band(s) and the target band. The ML model is trained on the basis of the reference signal strength maps. For example, for some of the cells of the wireless communication network, signal strength maps may be available for both the source band(s) and the target band, and these available signal strength maps may be used as reference signal strength maps for training the ML model. Alternatively, the reference signal strength maps may relate to frequency bands not including the target band, and sometimes also not the source band(s). In such cases, the ML model may be more generically trained to predict frequency dependent variations in signal strengths. The latter variant may for example be useful if no or very little data on signal strengths in the target band is available. Accordingly, the AI based mechanism may be used to estimate signal strength maps for a planned frequency band, that might not be on-air yet, from data relating to other frequency bands which are already in use.

As mentioned above, the estimation of the target signal strength maps may be based on a per-pair model, where the ML model is trained based on reference signal strength maps relating to the source band and to the target band, or on a general model, where the ML model is trained based on reference signal strength maps relating to frequency bands not including the target band, and possibly also not the source band(s), or not all source bands. In the per-pair model, the estimation may thus be based on a comparison between a single pair of frequency bands, i.e., the source band and the target band. For training the ML model, reference signal strength maps are needed from both the source band and the target band, however not for all cells or not for all pixels. In this case, the system will learn from pixels that contain signal level measurements from cells with the same location and azimuth at both the source band and the target band. The target metric to be predicted, also known as model label, may be the signal level difference between target band and source band or an isotropic losses delta, i.e., a difference between isotropic signal losses, which is based on the signal levels in the target band and source band. In the general model approach, the estimation may be based on the comparison of multiple reference frequency bands, which do not need to include the target band. A pixel can be used in the training process of learning if at least one pair of frequency bands corresponding to the same cell, location and azimuths are present. Here, the cell and pixel-specific model label is the signal level difference between all possible combinations of reference frequency bands independently. Accordingly, every pair of frequencies may be considered individually per pixel. The model can thus be trained to predict signal level differences for any pair of frequency bands. Additionally, it is possible to combine the learnt information from multiple source bands to predict the target signal strength maps for a certain target band, e.g., by using linear regression or other interpolation or extrapolation algorithms to obtain a combined prediction for the target band. For the per-pair model a higher accuracy of the estimate may be expected due to the training which directly considers the source band and the target band. On the other hand, the general model can be applied in a more flexible manner, including scenarios where data for the target band are not available for training the ML model.

Figure 3A:
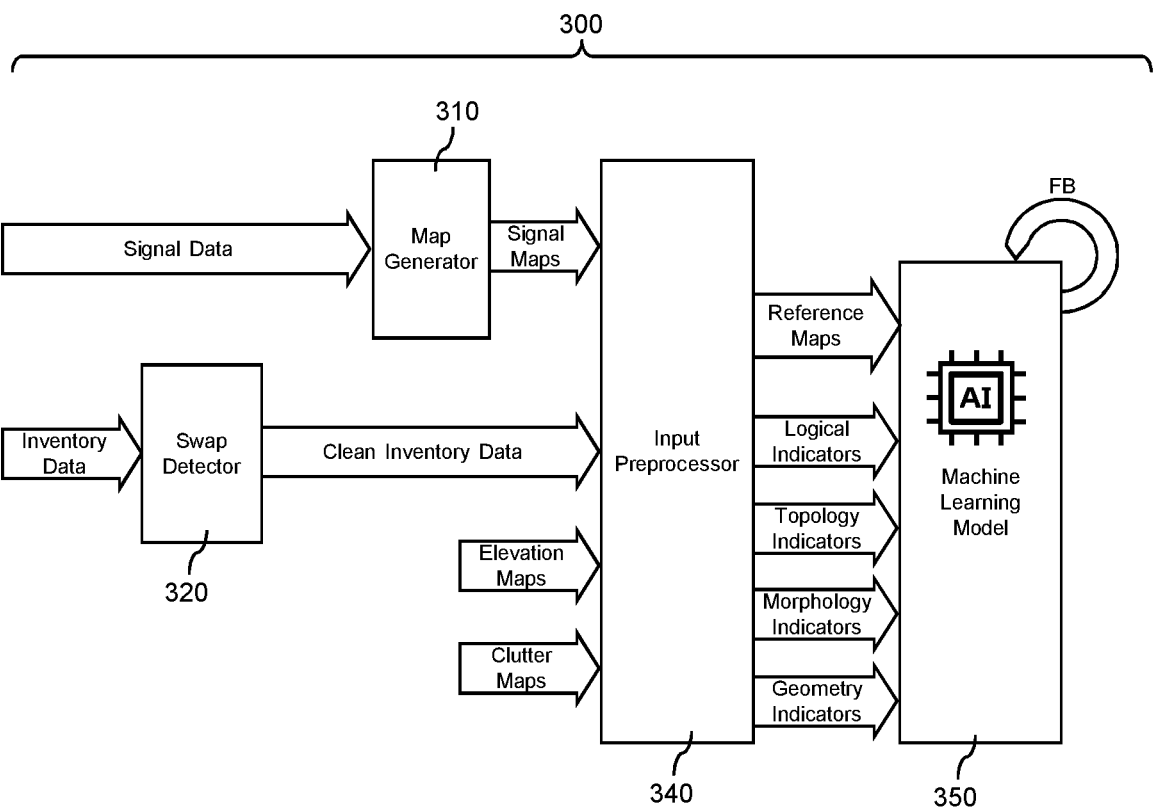
FIG. 3A schematically illustrates a training of a machine learning model according to an embodiment.
Figure 3B:
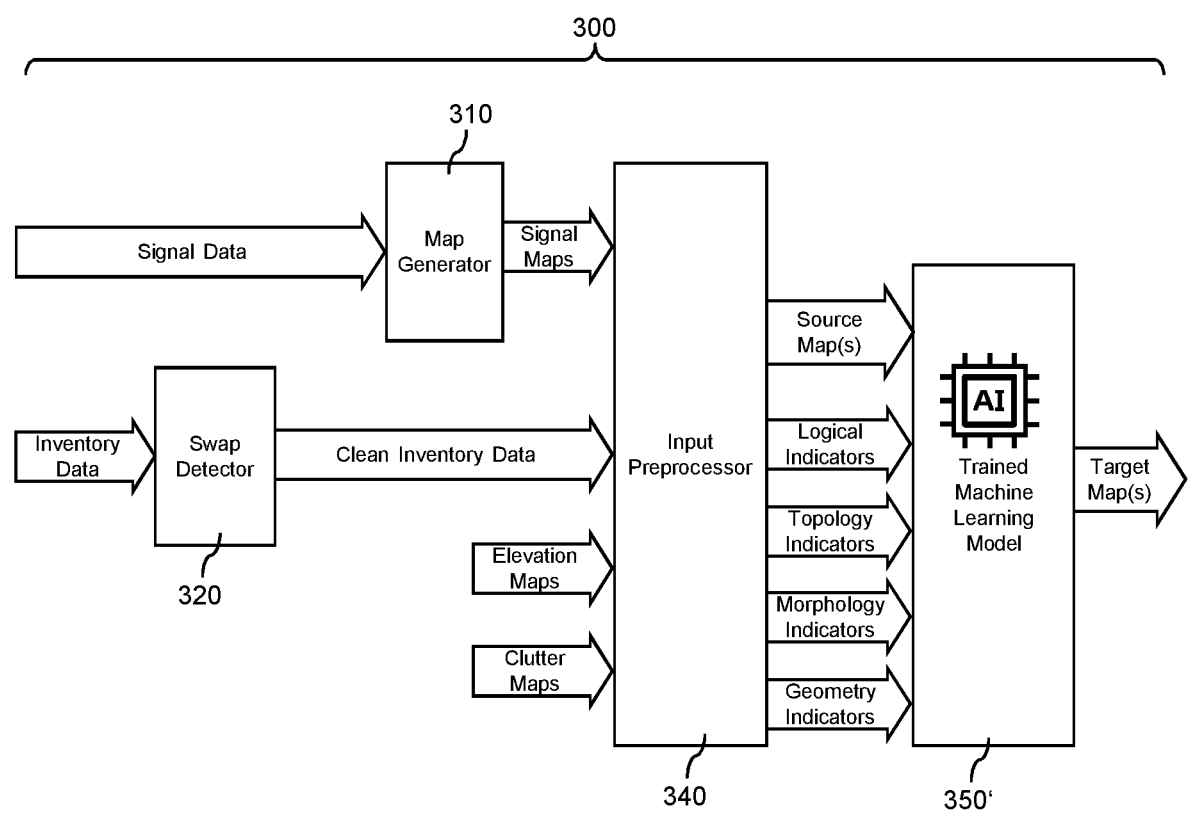
FIG. 3B schematically illustrates estimation of signal strength maps based on a trained machine learning model according to an embodiment.

FIG. 3A schematically illustrates a training phase of the AI based mechanism 300, and FIG. 3B schematically illustrates an inference phase of the AI based mechanism 300. As illustrated, the AI based mechanism 300 includes the ML model 350, e.g., based on a DNN or other artificial neural network. In the training phase, the ML model 350 is trained on the basis of various input data. As illustrated, the input data include the above-mentioned reference signal strength maps (reference maps). In addition, various other input data may be used, such as logical indicators, topology indicators, morphology indicators, and/or geometry indicators. In the inference phase, as illustrated by FIG. 3B, similar input data is used for estimating one or more target signal strength maps (target maps), using the trained ML model 350'.

The input data may for example be derived from data provided by the OSS 180 and/or, from crowdsourcing data, and/or from geographical databases. Crowdsourcing data may for example be used as a source of various measurement data, such as signal strength levels per cell, e.g., Reference Signal Received Power (RSRP) measurements per cell in LTE. Such data may be obtained for each of the reference frequency bands (to be used in the training phase) and for each of the source band(s) (to be used in the inference phase). Alternatively or in addition, the measurement data representing signal strength levels could also be obtained by from processing of geo-located call traces, via Minimization of Drive Tests (MDT), or various traditional triangulation methods. Further, the input data may be derived from altitude measurements, indicating measured altitudes in a location-specific manner. Further, the input data may be derived from additional configuration parameters, relating to network topology, such as site locations of antennas, RF configuration parameters, e.g., antenna parameters, such as heights, azimuth, and tilt. Again, such data may be obtained for each of the reference frequency bands (to be used in the training phase) and for each of the source band(s) (to be used in the inference phase). Further, the input data may be derived from CM information, in particular parameters that expected to have influence on the signal strength maps, such as transmission power or cable losses. Further, the input data may be derived from geographical maps, including clutter maps, terrain maps, and/or clutter height maps, in FIGS. 3A and 3B denoted by "elevation maps" and "clutter maps".

For deriving providing the input data to the ML model 350, 350', the AI based mechanism 300 may include various functionalities. Such functionalities include collection of the above-mentioned data for deriving the input data representing signal strength levels, in FIGS. 3A and 3B labeled as "signal data" and or deriving the other input data associated with the wireless communication network, in FIGS. 3A and 3B labeled as "inventory data", "elevation maps", and "clutter maps". In some scenarios, the signal data may be classified as relating either to indoor measurements or to outdoor measurements. In such cases, the further processing of the signal data could be divided into two independent processing flows: one for the indoor signal data and another for the outdoor signal data.

As further illustrated, the AI based mechanism 300 may be provided with a map generator 310 which generates signal strength maps from the signal data. In the training phase, such signal strength maps may be used as reference signal strength maps. In the inference phase, such signal strength maps may be used as source signal strength maps. If the signal data are classified as relating either to indoor measurements or to outdoor measurements, at least two signal strength maps may be generated for each cell, an indoor signal strength map based on the indoor signal data, and an outdoor signal strength map based on the outdoor signal data.

When generating the signal strength maps from the signal data, for each pixel of the cell the average signal level from all samples relating to the pixel may be computed to obtain the signal level to be represented in the signal strength map, however taking into account that that separate maps may be generated for indoor and outdoor. Alternatively, a vector with different percentiles of the distribution of signal level samples belonging to the pixel may be determined, again considering that separated maps may be created for indoor and outdoor.

Further, the AI based mechanism 300 may include a swap detector 320 for cleansing of the inventory data. The swap detector 320 may for example detect swapping of cell sectors or other changes of network inventory. Various implementations of the swap detector 320 may be utilized.

Further, the AI based mechanism 300 may include an input preprocessor 340. The input preprocessor 340 may receive the signal strength maps provided by the map generator 310, the inventory data, optionally as cleansed by the swap detector 320, the elevation maps, and the clutter maps. The input preprocessor 340 may manipulate the received signal strength maps together with the clutter maps and/or elevation maps and perform a mathematical transformation into features which a suitable as inputs of the ML model 350, 350'. By way of example, such feature could represent be the percentage of pixels of each type, e.g., clutter pixels, that the signal would pass through when propagating in straight line between a transmitting antenna and a location in the considered signal strength map.

The ML model 350, 350' is configured to predict the difference between the signal levels indicated for a given pixel in two signal strength maps relating to different frequency bands. In the training phase, as illustrated in FIG. 3A the ML model 350 is trained with reference signal strength maps relating to different reference frequency bands. This may involve using one of the reference signal strength maps as a basis for making a prediction for another frequency band, and then using another reference signal strength map for the same cell, but relating to this other frequency band, for assessing accuracy of the prediction and providing corresponding feedback (FB) to the ML model 350, so that prediction accuracy of the ML model 350 can be improved. This process can be repeated in an iterative manner until a desired level of accuracy is reached.

Figure 4:
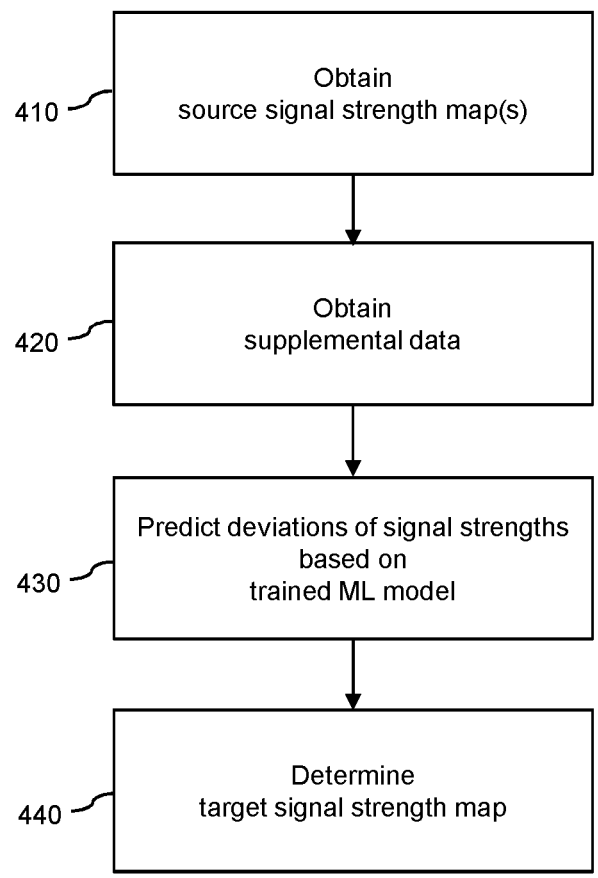
FIG. 4 shows a flowchart for schematically illustrating a method according to an embodiment.

FIG. 4 shows a flowchart for illustrating a method, which may be utilized for implementing the illustrated concepts. The method of FIG. 4 may be used for implementing the illustrated concepts in device for management of a wireless communication network, e.g., in the above-mentioned OSS 180 or in the above-mentioned network planning tool 200.

If a processor-based implementation of the device is used, at least some of the steps of the method of FIG. 4 may be performed and/or controlled by one or more processors of the device. Such device may also include a memory storing program code for implementing at least some of the below described functionalities or steps of the method of FIG. 4.

At step 410, at least one source signal strength map is obtained, to be used as a basis for estimating at least one target signal strength map describing signal propagation in a first frequency band. The at least one source signal strength map describes signal strengths in at least one second frequency band. The first frequency band may correspond to one of the above-mentioned target bands, and the at least one second frequency band may correspond to one or more of the above-mentioned source bands.

The at least one source signal strength map and the at least one target signal strength map relate to a coverage area of the wireless communication network, i.e., describe signal strengths in the coverage area. The coverage area may correspond to a cell of the wireless communication network. However, it is noted that the at least one target signal strength map and source signal strength map(s) could also be defined with respect to smaller or larger coverage areas, e.g., a cell sector, a cell group, a tracking area, or the like.

In some scenarios, the at least one source signal strength map may also be classified as being either an indoor signal strength map, which is based on indoor signal strength measurements, or an outdoor signal strength map, which is based on outdoor signal strength measurements. Accordingly, multiple source signal strength maps may be obtained which are distinguished as being either indoor or outdoor signal strength maps. In some scenarios, the at least one source signal strength map may be based on data collected by crowdsourcing and/or on call traces.

At step 420, supplemental data may be obtained. The supplemental data may include various types of data that are relevant for signal propagation in the coverage area. In particular, the supplemental data may include elevation data for the coverage area. Alternatively or in addition, the supplemental data may include clutter data for the coverage area. Alternatively or in addition, the supplemental data may include network infrastructure data for the coverage area. The network infrastructure data may for example describe location and type of network elements, e.g., access nodes or access node antennas, in the coverage area, and may also include information on configuration of such network elements.

At step 430, deviations of signal strengths in the first frequency band from signal strengths in the at least one second frequency band are predicted based on a trained ML model, e.g., the above-mentioned trained ML model 350'. The ML model may be based on a DNN. However, other types of artificial neural network or ML algorithm could be used as well.

The ML model may be previously trained on the basis of reference signal strength maps describing signal strengths in multiple different reference frequency bands. The reference signal strength maps describe signal strengths in one or more coverage areas of the wireless communication network. At least some of these coverage areas may differ from the coverage area to which the at least one source signal strength map and the at least one target signal strength map relate.

In some scenarios, corresponding to the above-mentioned per-pair model, the reference frequency bands may correspond to the first frequency band and the at least one second frequency band. In other scenarios, corresponding to the above-mentioned general model, at least some of the reference frequency bands may be different from the first frequency band and the at least one second frequency band.

In some scenarios, the ML model may be further trained based on at least one of: elevation data associated with the reference signal strength maps, clutter data associated with the reference signal strength maps, and network infrastructure data associated with the reference signal strength maps, similar to the supplemental data obtained at step 420.

In some scenarios, the reference signal strength maps may also be classified as being either an indoor signal strength map, which is based on indoor signal strength measurements, or an outdoor signal strength map, which is based on outdoor signal strength measurements. Accordingly, multiple reference signal strength maps may be obtained which are distinguished as being either indoor or outdoor signal strength maps. In some scenarios, the reference signal strength maps may be based on data collected by crowdsourcing.

At step 440, based on the at least one source signal strength map obtained at step 410 and the deviations of signal strengths predicted at step 430, the at least one target signal strength map is determined.

In some scenarios, the at least one target signal strength map may also be determined based on the supplemental data obtained at step 420. Accordingly, determination of the at least one target signal strength map may further be based on at least one of: elevation data for the one or more coverage areas, clutter data for the one or more coverage areas, and network infrastructure data for the coverage area.

In some scenarios, the at least one target signal strength map may also be classified as being either an indoor signal strength map, which represents indoor signal strength measurements, or an outdoor signal strength map, which represents outdoor signal strength measurements. Accordingly, multiple target signal strength maps may be obtained which are distinguished as being either indoor or outdoor signal strength maps. Here, a target signal strength map determined from at least one indoor source signal strength map may be classified as being an indoor signal strength map, and a target signal strength map determined from at least one outdoor source signal strength map may be classified as being an outdoor signal strength map.

Figure 5:
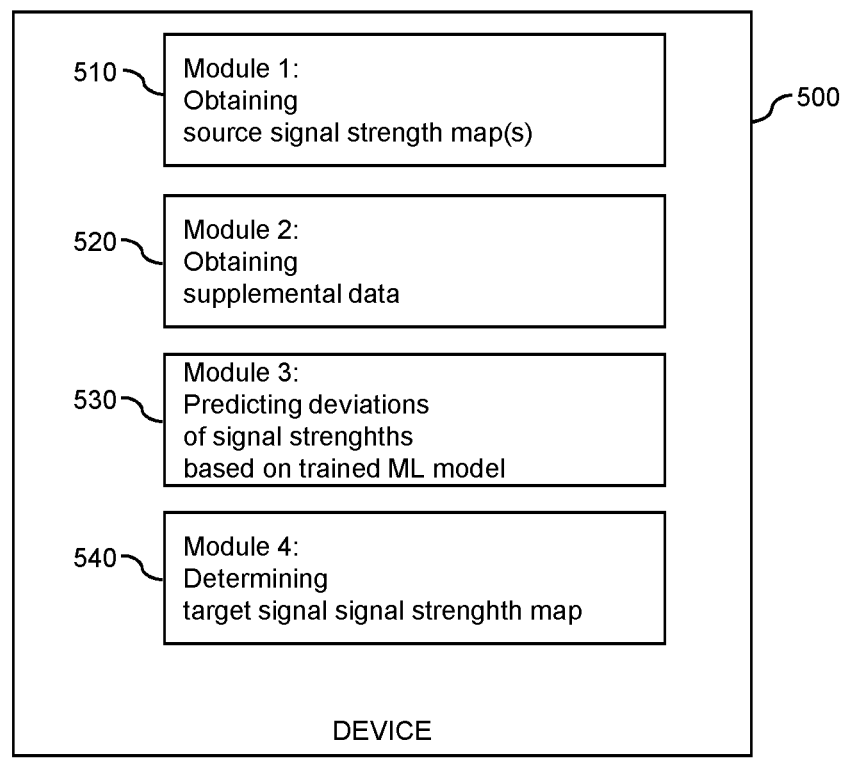
FIG. 5 shows a block diagram for schematically illustrating functionalities of a device according to an embodiment.

FIG. 5 shows a block diagram for illustrating functionalities of a device 500 which operates according to the method of FIG. 4. The device may for example correspond to the above-mentioned OSS 180 or in the above-mentioned network planning tool 200. As illustrated, the device 500 may be provided with a module 510 configured to obtain at least one source signal strength map, such as explained in connection with step 410. Further, the device 500 may optionally be provided with a module 520 configured to obtain supplemental data, such as explained in connection with step 420. Further, the device 500 may be provided with a module 530 configured to predict deviations in signal strengths, such as explained in connection with step 430. Further, the device 500 may be provided with a module 540 configured to determine at least one target signal strength map, such as explained in connection with step 440.

It is noted that the device 500 may include further modules for implementing other functionalities, such as known functionalities of an OSS or network planning tool. Further, it is noted that the modules of the device 500 do not necessarily represent a hardware structure of the device 500, but may also correspond to functional elements, e.g., implemented by hardware, software, or a combination thereof.

Figure 6:
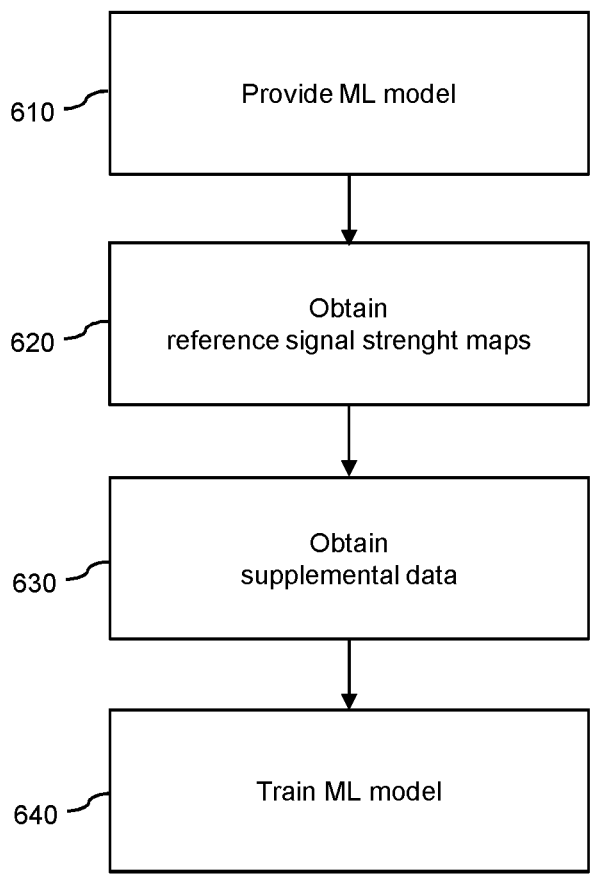
FIG. 6 shows a flowchart for schematically illustrating a further method according to an embodiment.

FIG. 6 shows a flowchart for illustrating a method, which may be utilized for implementing the illustrated concepts. The method of FIG. 6 may be used for implementing the illustrated concepts in device for management of a wireless communication network, e.g., in the above-mentioned OSS 180 or in the above-mentioned network planning tool 200.

If a processor-based implementation of the device is used, at least some of the steps of the method of FIG. 6 may be performed and/or controlled by one or more processors of the device. Such device may also include a memory storing program code for implementing at least some of the below described functionalities or steps of the method of FIG. 6.

At step 610, an ML model is provided, e.g., the above-mentioned ML model 350. The ML model may be based on a DNN. However, other types of artificial neural network or ML algorithm could be used as well. The ML model is configured to predict deviations of signal strengths in a first frequency band from signal strengths in at least one second frequency band.

At step 620, reference signal strength maps are obtained. The reference signal strength maps relate to one or more coverage areas of the wireless communication network, i.e., describe signal strengths in the respective coverage area. The coverage area may correspond to a cell of the wireless communication network. However, it is noted that the at least one target signal strength map and source signal strength map(s) could also be defined with respect to smaller or larger coverage areas, e.g., a cell sector, a cell group, a tracking area, or the like.

In some scenarios, the reference signal strength maps may also be classified as being either an indoor signal strength map, which is based on indoor signal strength measurements, or an outdoor signal strength map, which is based on outdoor signal strength measurements. Accordingly, multiple reference signal strength maps may be obtained which are distinguished as being either indoor or outdoor signal strength maps. In some scenarios, the reference signal strength maps may be based on data collected by crowdsourcing and/or on call traces.

At step 630, supplemental data may be obtained. The supplemental data may include various types of data that are relevant for signal propagation in the one or more coverage areas. In particular, the supplemental data may include elevation data for the one or more coverage areas. Alternatively or in addition, the supplemental data may include clutter data for the one or more coverage areas. Alternatively or in addition, the supplemental data may include network infrastructure data for the one or more coverage areas. The network infrastructure data may for example describe location and type of network elements, e.g., access nodes or access node antennas, in the coverage area, and may also include information on configuration of such network elements.

At step 640, the ML model is trained based on the basis of reference signal strength maps obtained at step 620. After the training, the trained ML model may be operable for predicting deviations in signal strengths between the first frequency band and the at least one second frequency band. These frequency bands may correspond to the reference frequency bands or may differ from the reference frequency bands. Further, the trained ML model may be operable for predicting the deviations also in one a coverage area of the wireless communication network that differs from the one or more coverage areas to which the reference signal strength maps relate.

In some scenarios, step 640 may also involve training the ML model further based on the supplemental data obtained at step 620. Accordingly, the ML model may be trained on at least one of: elevation data associated with the reference signal strength maps, clutter data associated with the reference signal strength maps, and network infrastructure data associated with the reference signal strength maps.

Figure 7:
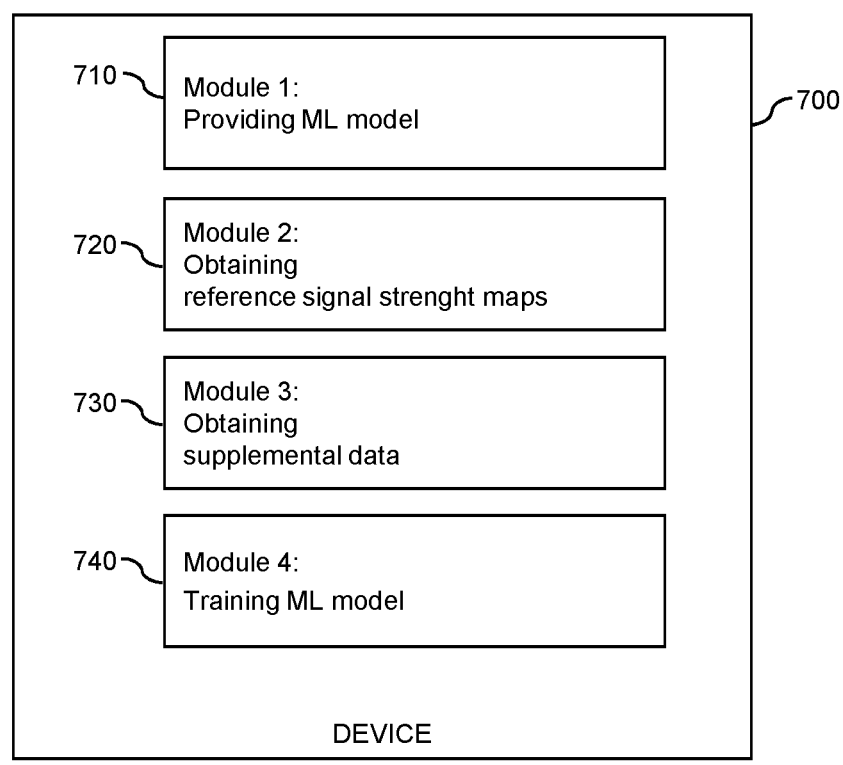
FIG. 7 shows a block diagram for schematically illustrating functionalities of a further device according to an embodiment.

FIG. 7 shows a block diagram for illustrating functionalities of a device 700 which operates according to the method of FIG. 6. The device may for example correspond to the above-mentioned OSS 180 or in the above-mentioned network planning tool 200. As illustrated, the device 700 may be provided with a module 710 configured to provide an ML model, such as explained in connection with step 610. Further, the device 700 may optionally be provided with a module 720 configured to obtain reference signal strength maps, such as explained in connection with step 630. Further, the device 700 may optionally be provided with a module 730 configured to obtain supplemental data, such as explained in connection with step 630. Further, the device 700 may be provided with a module 740 configured to train the ML model, such as explained in connection with step 640.

It is noted that the device 700 may include further modules for implementing other functionalities, such as known functionalities of an OSS or network planning tool. Further, it is noted that the modules of the device 700 do not necessarily represent a hardware structure of the device 700, but may also correspond to functional elements, e.g., implemented by hardware, software, or a combination thereof.

It is noted that the functionalities as described in connection with FIGS. 4 and 5 could also be combined with the functionalities as described in connection with FIGS. 6 and 7, e.g., in a device which is configured to support training of the ML model according to the method of FIG. 6 and subsequent utilization of the trained ML model according to the method of FIG. 4. However, it is noted that training of the ML model and subsequent application of the ML model could also be implemented in separately, e.g., by providing a device utilizing the trained ML model according to the method of FIG. 4 with training data obtained by another device operating according to the method of FIG. 6.

Figure 8:
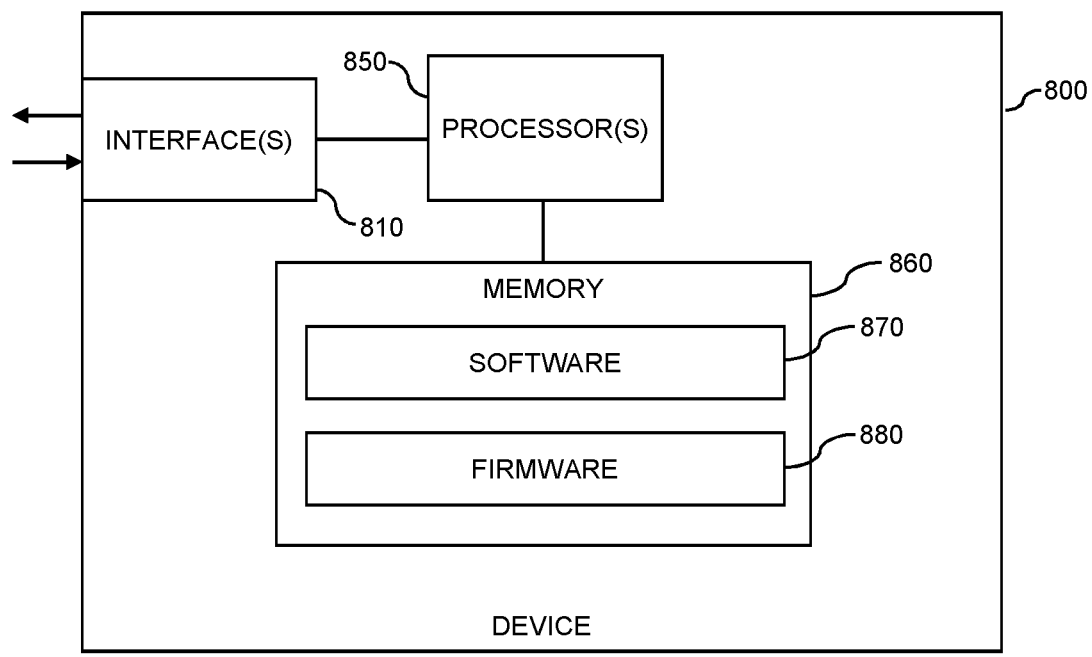
FIG. 8 schematically illustrates structures of a device according to an embodiment.

FIG. 8 illustrates a processor-based implementation of a device 800 which may be used for implementing the above-described concepts. For example, the structures as illustrated in FIG. 8 may be used for implementing the concepts in the above-mentioned OSS 180 or network planning tool 200.

As illustrated, the device 800 includes one or more interfaces 810. The interface(s) 810 may for example be used for receiving the above-mentioned source signal strength maps or reference signal strength maps or for outputting estimated target signal strength maps. Further, the interface(s) 810 may be used for receiving various kinds of supplemental data to be used in the estimation of target signal strength maps or in the training of the ML model.

Further, the device 800 may include one or more processors 850 coupled to the interface(s) 810 and a memory 860 coupled to the processor(s) 850. By way of example, the interface(s) 810, the processor(s) 850, and the memory 860 could be coupled by one or more internal bus systems of the device 800. The memory 860 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 860 may include software 870 and/or firmware 880. The memory 860 may include suitably configured program code to be executed by the processor(s) 850 so as to implement the above-described functionalities for managing a wireless communication network, such as explained in connection with FIG. 4 or 6.

It is to be understood that the structures as illustrated in FIG. 8 are merely schematic and that the device 800 may actually include further components which, for the sake of clarity, have not been illustrated, e.g., further interfaces or further processors. Also, it is to be understood that the memory 860 may include further program code for implementing known functionalities of an OSS or network planning tool. According to some embodiments, also a computer program may be provided for implementing functionalities of the device 800, e.g., in the form of a physical medium storing the program code and/or other data to be stored in the memory 860 or by making the program code available for download or by streaming.

As can be seen, the concepts as described above may be used for efficiently managing a wireless communication network, in particular with respect to planning deployment in new frequency bands. In the illustrated concepts, the possibility of using crowdsourcing data drastically widens applicability as compared to methods that require arranging costly and time-consuming drive test campaigns or enabling periodical measurement reporting. Here, a particular benefit is that crowdsourcing data is potentially available for various markets and operators. Further, the illustrated concepts may allow for cost reduction by enabling simplified network planning tools. Further, the illustrated concepts may allow for fast estimation of signal strength maps and enhanced or even full automation of network planning, without relying on expertise knowledge of planning personnel. Further, the illustrated concepts may also allow for efficient integration in realtime operation of the wireless communication network, with measurements from sources within the wireless communication network and/or newly collected crowdsourcing data providing a basis for continuously improving estimates of signal strength maps.

It is to be understood that the examples and embodiments as explained above are merely illustrative and susceptible to various modifications. For example, the illustrated concepts may be applied in connection with various kinds of wireless technologies, without limitation to LTE or NR networks. Further, the concepts may utilize various types of ML algorithms. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

In view of the above, embodiments provided in the present disclosure include:

Embodiment 1

A method of managing a wireless communication network, the method comprising:
- based on a trained machine-learning model (350'), predicting deviations of signal strengths in a first frequency band (21, 22, 31, 32, 41, 42, 51, 52) from signal strengths in at least one second frequency band (21, 22, 31, 32, 41, 42, 51, 52);
- obtaining at least one source signal strength map describing signal strengths in the at least one second frequency band (21, 22, 31, 32, 41, 42, 51, 52) for a coverage area (100-1, 100-2, 100-3, 100-4) of the wireless communication network; and
- based on the at least one source signal strength map and the predicted deviations of signal strengths, determining at least one target signal strength map describing signal strengths in the first frequency band (21, 22, 31, 32, 41, 42, 51, 52) for the coverage area of the wireless communication network.

Embodiment 2

The method according to embodiment 1, comprising:
- determining the at least one target signal strength map further based on elevation data for the coverage area.

Embodiment 3

The method according to embodiment 1 or 2, comprising:
- determining the at least one target signal strength map further based on clutter data for the coverage area Embodiment 4

The method according to any one of embodiments 1 to 4, comprising:
- determining the at least one target signal strength map further based on network infrastructure data for the coverage area (100-1, 100-2, 100-3, 100-4).

Embodiment 5

The method according to any one of embodiments 1 to 4, wherein the machine-learning model (350') is trained on the basis of reference signal strength maps describing signal strengths in multiple different reference frequency bands (21, 22, 31, 32, 41, 42, 51, 52) for one or more coverage areas (100-1, 100-2, 100-3, 100-4) of the wireless communication network.

Embodiment 6

The method according to embodiment 5,
wherein the reference frequency bands comprise the first frequency band (21, 22, 31, 32, 41, 42, 51, 52) and/or the at least one second frequency band (21, 22, 31, 32, 41, 42, 51, 52).

Embodiment 7

The method according to embodiment 5 or 6,
wherein the machine-learning model (350') is further trained based on elevation data associated with the reference signal strength maps.

Embodiment 8

The method according to any one of embodiments 5 to 7,
wherein the machine-learning model (350') is further trained based on clutter data associated with the reference signal strength maps.

Embodiment 9

The method according to any one of embodiments 5 to 8,
wherein the machine-learning model (350') is further trained based on network infrastructure data associated with the reference signal strength maps.

Embodiment 10

The method according to any one of embodiments 5 to 9,
wherein the reference signal strength maps are based on data collected by crowdsourcing.

Embodiment 11

The method according to any one of the embodiments 1 to 10,
wherein the at least one source signal strength map is based on data collected by crowdsourcing.

Embodiment 12

A method of managing a wireless communication network, the method comprising:
providing a machine-learning model (350) for predicting deviations of signal strengths in a first frequency band (21, 22, 31, 32, 41, 42, 51, 52) from signal strengths in at least one second frequency band (21, 22, 31, 32, 41, 42, 51, 52); and
training the machine-learning model on the basis of reference signal strength maps describing signal strengths in multiple different reference frequency bands (21, 22, 31, 32, 41, 42, 51, 52) for one or more coverage areas (100-1, 100-2, 100-3, 100-4) of the wireless communication network.

Embodiment 13

The method according to embodiment 8,
wherein the reference frequency bands comprise the first frequency band (21, 22, 31, 32, 41, 42, 51, 52) and/or the at least one second frequency band (21, 22, 31, 32, 41, 42, 51, 52).

Embodiment 14

The method according to embodiment 12 or 13,
wherein the machine-learning model (350) is further trained based on elevation data associated with the reference signal strength maps.

Embodiment 15

The method according to any one of embodiments 12 to 14,
wherein the machine-learning model (350) is further trained based on clutter data associated with the reference signal strength maps.

Embodiment 16

The method according to any one of embodiments 12 to 15,
wherein the machine-learning model (350) is further trained based on network infrastructure data associated with the reference signal strength maps.

Embodiment 17

The method according to any one of embodiments 12 to 16,
wherein the reference signal strength maps are based on data collected by crowdsourcing.

Embodiment 18

A device (180, 200; 500; 700; 800) for managing a wireless communication network, the device (180, 200; 500; 700; 800) being configured to:
based on a trained machine-learning model (350'), predicting deviations of signal strengths in a first frequency band (21, 22, 31, 32, 41, 42, 51, 52) from signal strengths in one or more second frequency bands (21, 22, 31, 32, 41, 42, 51, 52);
obtain at least one source signal strength map describing signal strengths in at least one of the second frequency bands (21, 22, 31, 32, 41, 42, 51, 52) for one or more coverage areas (100-1, 100-2, 100-3, 100-4) of the wireless communication network; and
based on the at least one source signal strength map and the predicted deviations of signal strengths, determining a target signal strength map describing signal strengths in the first frequency band (21, 22, 31, 32, 41, 42, 51, 52) for at least one of the coverage areas (100-1, 100-2, 100-3, 100-4) of the wireless communication network.

Embodiment 19

The device (180, 200; 500; 700; 800) according to embodiment 12,
wherein the device (180, 200; 500; 700; 800) is configured to perform a method according to any one of embodiments 2 to 7.

Embodiment 20

The device (180, 200; 500; 700; 800) according to embodiment 18 or 19,
  wherein the device (180, 200; 500; 700; 800) is configured to determine the at least one target signal strength map further based on elevation data for the coverage area.

Embodiment 21

The device (180, 200; 500; 700; 800) according to any one of embodiments 18 to 20,
  wherein the device (180, 200; 500; 700; 800) is configured to determine the at least one target signal strength map further based on clutter data for the coverage area

Embodiment 22

The device (180, 200; 500; 700; 800) according to any one of embodiments 18 to 21,
  wherein the device (180, 200; 500; 700; 800) is configured to determine the at least one target signal strength map further based on network infrastructure data for the coverage area (100-1, 100-2, 100-3, 100-4).

Embodiment 23

The device (180, 200; 500; 700; 800) according to any one of embodiments 18 to 22,
  wherein the machine-learning model (350') is trained on the basis of reference signal strength maps describing signal strengths in multiple different reference frequency bands (21, 22, 31, 32, 41, 42, 51, 52) for one or more coverage areas (100-1, 100-2, 100-3, 100-4) of the wireless communication network.

Embodiment 24

The device (180, 200; 500; 700; 800) according to embodiment 23,
  wherein the reference frequency bands comprise the first frequency band (21, 22, 31, 32, 41, 42, 51, 52) and/or the at least one second frequency band (21, 22, 31, 32, 41, 42, 51, 52).

Embodiment 25

The device (180, 200; 500; 700; 800) according to embodiment 23 or 24,
  wherein the machine-learning model (350') is further trained based on elevation data associated with the reference signal strength maps.

Embodiment 26

The device (180, 200; 500; 700; 800) according to any one of embodiments 23 to 25,
  wherein the machine-learning model (350') is further trained based on clutter data associated with the reference signal strength maps.

Embodiment 27

The device (180, 200; 500; 700; 800) according to any one of embodiments 23 to 26,
  wherein the machine-learning model (350') is further trained based on network infrastructure data associated with the reference signal strength maps.

Embodiment 28

The device (180, 200; 500; 700; 800) according to any one of embodiments 23 to 27,
  wherein the reference signal strength maps are based on data collected by crowdsourcing.

Embodiment 29

The device (180, 200; 500; 700; 800) according to any one of the embodiments 18 to 28,
  wherein the at least one source signal strength map is based on data collected by crowdsourcing.

Embodiment 30

A device (180, 200; 500; 700; 800) for managing a wireless communication network, the device (180, 200; 500; 700; 800) being configured to:
  provide a machine-learning model (350) for predicting deviations of signal strengths in a first frequency band (21, 22, 31, 32, 41, 42, 51, 52) from signal strengths in at least one second frequency band (21, 22, 31, 32, 41, 42, 51, 52); and
  train the machine-learning model on the basis of reference signal strength maps describing signal strengths in multiple different reference frequency bands (21, 22, 31, 32, 41, 42, 51, 52) for one or more coverage areas (100-1, 100-2, 100-3, 100-4) of the wireless communication network.

Embodiment 31

The device (180, 200; 500; 700; 800) according to embodiment 30,
  wherein the device (180, 200; 500; 700; 800) is configured to perform a method according to any one of embodiments 12 to 17.

Embodiment 32

The device (180, 200; 500; 700; 800) according to embodiment 30 or 31,
  wherein the reference frequency bands comprise the first frequency band (21, 22, 31, 32, 41, 42, 51, 52) and/or the at least one second frequency band (21, 22, 31, 32, 41, 42, 51, 52).

Embodiment 33

The device (180, 200; 500; 700; 800) according to any one of embodiments 30 to 32,
  wherein the device (180, 200; 500; 700; 800) is configured to train the machine-learning model (350) further based elevation data associated with the reference signal strength maps.

Embodiment 34

The device (180, 200; 500; 700; 800) according to any one of embodiments 30 to 33, wherein the device (180, 200; 500; 700; 800) is configured to train the machine-learning model (350) further based on clutter data associated with the reference signal strength maps.

Embodiment 35

The device (180, 200; 500; 700; 800) according to any one of embodiments 30 to 34,
wherein the device (180, 200; 500; 700; 800) is configured to train the machine-learning model (350) further based on network infrastructure data associated with the reference signal strength maps.

Embodiment 36

The device (180, 200; 500; 700; 800) according to any one of embodiments 30 to 35,
wherein the reference signal strength maps are based on data collected by crowdsourcing.

Embodiment 37

A computer program or computer program product comprising program code to be executed by at least one processor (850) of a device (180, 200; 500; 700; 800) for managing a wireless communication network, whereby execution of the program code causes the device (180, 200; 500; 700; 800) to perform a method according to any one of embodiments 1 to 17.

The invention claimed is:

1. A method of managing a wireless communication network, the method comprising:
    based on a trained machine-learning model, predicting deviations of signal strengths in a first frequency band from signal strengths in at least one second frequency band;
    obtaining at least one source signal strength map describing signal strengths in the at least one second frequency band for a coverage area of the wireless communication network; and
    based on the at least one source signal strength map and the predicted deviations of signal strengths, determining at least one target signal strength map describing signal strengths in the first frequency band for the coverage area of the wireless communication network.

2. The method according to claim 1, comprising:
    determining the at least one target signal strength map further based on elevation data for the coverage area.

3. The method according to claim 1, comprising:
    determining the at least one target signal strength map further based on clutter data for the coverage area.

4. The method according to claim 1, comprising:
    determining the at least one target signal strength map further based on network infrastructure data for the coverage area.

5. The method according to claim 1,
    wherein the machine-learning mode is trained on the basis of reference signal strength maps describing signal strengths in multiple different reference frequency bands for one or more coverage areas of the wireless communication network.

6. The method according to claim 5,
    wherein the reference frequency bands comprise the first frequency band and/or the at least one second frequency band.

7. The method according to claim 5,
    wherein the machine-learning model is further trained based on elevation data associated with the reference signal strength maps.

8. The method according to claim 5,
    wherein the machine-learning model is further trained based on clutter data associated with the reference signal strength maps.

9. The method according to claim 5,
    wherein the machine-learning model is further trained based on network infrastructure data associated with the reference signal strength maps.

10. The method according to claim 1, further comprising:
    training the machine-learning model on the basis of reference signal strength maps describing signal strengths in multiple different reference frequency bands for one or more coverage areas of the wireless communication network.

11. The method according to claim 10,
    wherein the reference frequency bands comprise the first frequency band and/or the at least one second frequency band.

12. The method according to claim 10,
    wherein the machine-learning model is further trained based on elevation data associated with the reference signal strength maps.

13. The method according to claim 10,
    wherein the machine-learning model is further trained based on clutter data associated with the reference signal strength maps.

14. The method according to claim 10,
    wherein the machine-learning model is further trained based on network infrastructure data associated with the reference signal strength maps.

15. The method according to claim 10,
    wherein the reference signal strength maps are based on data collected by crowdsourcing.

16. A device for managing a wireless communication network, the device being configured to:
    based on a trained machine-learning model, predict deviations of signal strengths in a first frequency band from signal strengths in one or more second frequency bands;
    obtain at least one source signal strength map describing signal strengths in at least one of the second frequency bands for one or more coverage areas of the wireless communication network; and
    based on the at least one source signal strength map and the predicted deviations of signal strengths, determine a target signal strength map describing signal strengths in the first frequency band for at least one of the coverage areas of the wireless communication network.

17. The device according to claim 16,
    wherein the device is configured to determine the at least one target signal strength map further based on elevation data for the coverage area.

18. The device according to claim 16,
    wherein the device is configured to train the machine-learning model on the basis of reference signal strength maps describing signal strengths in multiple different reference frequency bands for one or more coverage areas of the wireless communication network.

19. The device according to claim 18,
    wherein the reference frequency bands comprise the first frequency band and/or the at least one second frequency band.

20. A computer program product comprising program code to be executed by at least one processor of a device for managing a wireless communication network, whereby execution of the program code causes the device to perform a method according to claim 1.

* * * * *